United States Patent
Fleyder et al.

(10) Patent No.: US 9,838,419 B1
(45) Date of Patent: Dec. 5, 2017

(54) DETECTION AND REMEDIATION OF WATERING HOLE ATTACKS DIRECTED AGAINST AN ENTERPRISE

(71) Applicant: EMC Corporation, Hopkinton, MA (US)

(72) Inventors: Uri Fleyder, Giv'at Shumel (IL); Rotem Kerner, Tel Aviv (IL); Zeev Rabinovich, Tel Aviv (IL); Rotem Salinas, Netanya (IL); Daniel Frank, Giv'at Shumel (IL); Lior Ben-Porat, Petah Tikva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 151 days.

(21) Appl. No.: 14/954,043

(22) Filed: Nov. 30, 2015

(51) Int. Cl.
*H04L 29/06* (2006.01)

(52) U.S. Cl.
CPC ........ *H04L 63/145* (2013.01); *H04L 63/0227* (2013.01); *H04L 63/10* (2013.01); *H04L 63/101* (2013.01); *H04L 63/1425* (2013.01)

(58) Field of Classification Search
CPC ... H04L 63/145; H04L 63/10; H04L 63/1425; H04L 63/101; H04L 63/0227
See application file for complete search history.

(56) References Cited

U.S. PATENT DOCUMENTS

| | | | |
|---|---|---|---|
| 9,251,343 B1 * | 2/2016 | Vincent | G06F 21/575 |
| 2006/0069671 A1 * | 3/2006 | Conley | G06F 17/30887 |
| 2007/0192855 A1 | 8/2007 | Hulten et al. | |
| 2008/0120420 A1 * | 5/2008 | Sima | G06F 17/30864 709/229 |
| 2011/0225650 A1 * | 9/2011 | Margolies | G06F 21/554 726/22 |
| 2014/0317754 A1 | 10/2014 | Niemela et al. | |
| 2015/0096024 A1 * | 4/2015 | Haq | H04L 63/145 726/23 |
| 2015/0264069 A1 * | 9/2015 | Beauchesne | H04L 63/1416 726/23 |
| 2015/0373039 A1 * | 12/2015 | Wang | H04L 63/1425 726/23 |
| 2016/0021142 A1 * | 1/2016 | Gafni | H04L 63/1425 726/23 |
| 2016/0173510 A1 * | 6/2016 | Harris | H04L 63/1416 726/23 |
| 2016/0226900 A1 * | 8/2016 | Fajardo Verano | G06F 21/55 |
| 2017/0091467 A1 * | 3/2017 | Pogorelik | G06F 21/6209 |

* cited by examiner

*Primary Examiner* — Hosuk Song
*Assistant Examiner* — J. Brant Murphy
(74) *Attorney, Agent, or Firm* — Ryan, Mason & Lewis, LLP

(57) ABSTRACT

A method comprises obtaining data characterizing web browsing activity of a group of users of an enterprise, processing the data characterizing the web browsing activity to identify one or more patterns of web browsing activity of the group of users, selecting, based on the patterns of web browsing activity, at least one website to check for evidence of a watering hole attack threat to the enterprise, analyzing elements of said at least one website to identify executable code evidencing the watering hole attack threat to the enterprise, and modifying access by one or more client devices of the enterprise to said at least one website responsive to identifying executable code of said at least one website evidencing the watering hole attack threat to the enterprise.

20 Claims, 5 Drawing Sheets

DETECTION AND REMEDIATION OF WATERING HOLE ATTACKS DIRECTED AGAINST AN ENTERPRISE

FIELD

The field relates generally to security, and more particularly to detection of security threats.

BACKGROUND

Various entities are subject to different types of security threats. Some security threats relate to networking and computer security for client devices used by members of an entity, such as a business, organization or other enterprise. Watering hole attacks are an example of such security threats. In a watering hole attack, the target victim of the attack may be an enterprise itself, or one or more members or groups of members of an enterprise. An attacker attempts to guess or observe which websites the members or groups of members visit. In some cases, this involves identifying a set of websites trusted by the particular enterprise. One or more members or groups of members are infected when an attacker is able to infect trusted websites with malware or other malicious code.

SUMMARY

Illustrative embodiments of the present invention provide techniques for detection of watering hole attacks. Such techniques in some embodiments advantageously permit a network security system to focus its efforts on particular sources that are most likely to be subject to watering hole attacks.

Accordingly, limited resources of a network security system used in detection and remediation of watering hole attacks can be more intelligently and effectively deployed, resulting in improved performance as well as enhanced security against attacks including watering hole attacks.

In one embodiment, a method comprises obtaining data characterizing web browsing activity of a group of users of an enterprise, processing the data characterizing the web browsing activity to identify one or more patterns of web browsing activity of the group of users, selecting, based on the patterns of web browsing activity, at least one website to check for evidence of a watering hole attack threat to the enterprise, analyzing elements of said at least one website to identify executable code evidencing the watering hole attack threat to the enterprise, and modifying access by one or more client devices of the enterprise to said at least one website responsive to identifying executable code of said at least one website evidencing the watering hole attack threat to the enterprise. The method is performed by at least one processing device comprising a processor coupled to a memory.

The processing device may be implemented, for example, in one or more network devices in a computer network, in a security operations center of an enterprise, or in a security analytics system or other type of network security system associated with the computer network or an enterprise.

These and other illustrative embodiments include, without limitation, methods, apparatus, networks, systems and processor-readable storage media.

DETAILED DESCRIPTION

Illustrative embodiments of the present invention will be described herein with reference to exemplary computer networks and associated computers, servers, network devices or other types of processing devices. It is to be appreciated, however, that the invention is not restricted to use with the particular illustrative network and device configurations shown. Accordingly, the term "computer network" as used herein is intended to be broadly construed, so as to encompass, for example, any system comprising multiple networked processing devices.

Figure 1:
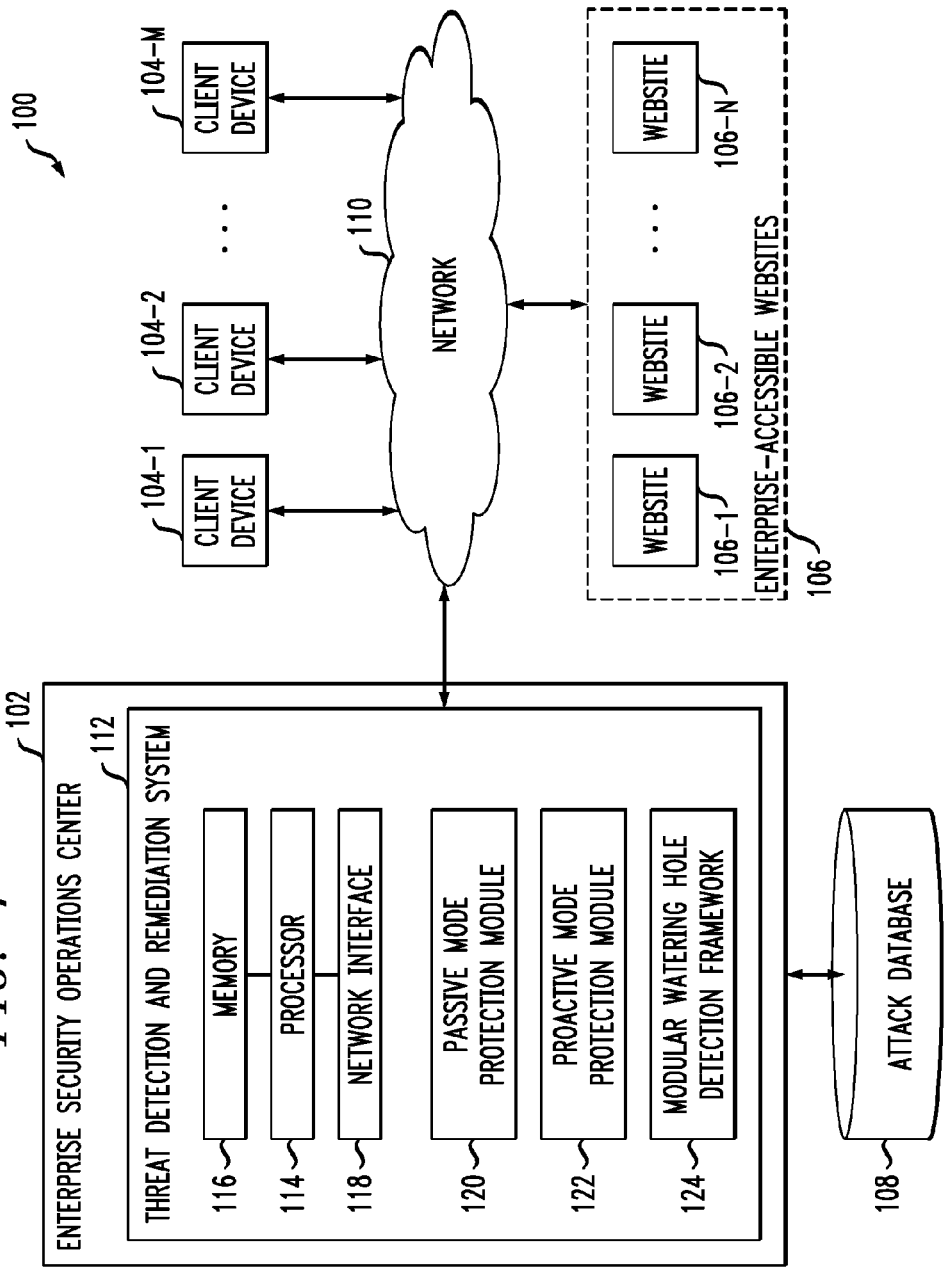
FIG. 1 is a block diagram of an information processing system for detecting and remediating watering hole attacks in an illustrative embodiment of the invention.

FIG. 1 shows a computer network 100 configured in accordance with an illustrative embodiment of the invention. The computer network 100 comprises an enterprise security operations center (SOC) 102 and a plurality of client devices 104-1, 104-2, . . . 104-M, collectively referred to herein as client devices 104. The client devices 104 are coupled to a network 110, where the network 110 in this embodiment is assumed to represent a sub-network or other related portion of the larger computer network 100. Accordingly, elements 100 and 110 are both referred to herein as examples of "networks" but the latter is assumed to be a component of the former in the context of the FIG. 1 embodiment. Also coupled to the network 110 is a set of enterprise-accessible websites 106, including websites 106-1, 106-2, . . . 106-N.

The client devices 104 may comprise, for example, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers."

The client devices 104 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

The network 110 is assumed to comprise a global computer network such as the Internet, although other types of networks can be part of the computer network 100, including a wide area network (WAN), a local area network (LAN), a satellite network, a telephone or cable network, a cellular network, a wireless network such as a WiFi or WiMAX network, or various portions or combinations of these and other types of networks. The computer network 100 in some embodiments therefore comprises combinations of multiple different types of networks each comprising processing devices configured to communicate using IP or other related communication protocols.

The enterprise SOC 102 has an associated attack database 108 configured to store and record information relating to threats and attacks including watering hole attacks. The attack database 108 may, in some embodiments, more particularly store a blacklist of sites known to be part of or susceptible to watering hole attacks, although additional or alternative information may be stored in other embodiments.

The attack database 108 in some embodiments is implemented using one or more storage devices associated with the enterprise SOC 102. Such storage devices may comprise, for example, storage products such as VNX® and Symmetrix VMAX®, both commercially available from EMC Corporation of Hopkinton, Mass. A variety of other storage products may be utilized to implement at least a portion of the storage devices associated with the enterprise SOC 102.

Although not explicitly shown in FIG. 1, one or more input-output devices such as keyboards, displays or other types of input-output devices may be used to support one or more user interfaces to the enterprise SOC 102, as well as to support communication between the enterprise SOC 102 and other related systems and devices not explicitly shown.

In the present embodiment, alerts or notifications generated by a threat detection and remediation system 112 of the enterprise SOC 102 are provided over network 110 to client devices 104, or to a system administrator, information technology (IT) manager, or other authorized personnel via one or more security agents. Such security agents may be implemented via the client devices 104 or by other computing or processing devices associated with a system administrator, IT manager or other authorized personnel. Such devices can illustratively comprise mobile telephones, laptop computers, tablet computers, desktop computers, or other types of computers or processing devices configured for communication over network 110 with the enterprise SOC 102 and the threat detection and remediation system 112. For example, a given security agent may comprise a mobile telephone equipped with a mobile application configured to receive alerts from the enterprise SOC 102 or the threat detection and remediation system 112 and to provide an interface for the security agent to select particular remedial measures for responding to the alert or notification. Examples of such remedial measures may include blocking access to one or more websites, requiring user input or authentication to visit certain websites believed to be part of an attack, etc.

It should be noted that a "security agent" as the term is generally used herein may comprise an automated entity, such as a software entity running on a processing device. Accordingly, a security agent need not be a human entity.

As shown in FIG. 1, the enterprise SOC 102 comprises threat detection and remediation system 112. As will be described in further detail below, the threat detection and remediation system 112 is configured to monitor the web browsing activity of client devices 104 associated with users of an enterprise, to analyze enterprise-accessible websites 106 to check for evidence of a watering hole attack threat to the enterprise, and to modify access by the client devices 104 to one or more of the enterprise accessible websites 106 responsive to detecting evidence of the watering hole attack threat.

It is important to note that the term website should be construed broadly. For example, a website may include a plurality of different web pages. Analyzing or checking a website may include analyzing or checking a single web page that is part of the website or a collection of two or more of the web pages that are part of the website. Thus, references herein to identifying a website, checking a website, etc. include identifying or checking only a subset of the web pages of a website. It is also important to note that a website need not be accessed via a web browser and displayed on a screen of client device. For example, various smartphones, tablets and other mobile computing devices access information available over the Internet or other wireless networks in the form of applications that are not necessarily web browsers. Smartphones may include various applications which retrieve information from websites or other Internet sources without necessarily displaying the website on a display of the smartphone. Analyzing a website may include analyzing information from the Internet or other such sources.

Although shown as an element of the enterprise SOC 102 in this embodiment, the threat detection and remediation system 112 in other embodiments can be implemented at least in part externally to the enterprise SOC 102, for example, as a stand-alone server, set of servers or other type of system coupled to the network 110.

The threat detection and remediation system 112 in the FIG. 1 embodiment is assumed to be implemented using at least one processing device. Each such processing device generally comprises at least one processor and an associated memory, and implements one or more functional modules for controlling certain features of the threat detection and remediation system 112.

More particularly, the threat detection and remediation system 112 in this embodiment comprises a processor 114 coupled to a memory 116 and a network interface 118.

The processor 114 illustratively comprises a microprocessor, a microcontroller, an application-specific integrated circuit (ASIC), a field-programmable gate array (FPGA) or other type of processing circuitry, as well as portions or combinations of such circuitry elements.

The memory 116 illustratively comprises random access memory (RAM), read-only memory (ROM) or other types of memory, in any combination. The memory 116 and other memories disclosed herein may be viewed as examples of what are more generally referred to as "processor-readable storage media" storing executable computer program code or other types of software programs.

Articles of manufacture comprising such processor-readable storage media are considered embodiments of the present invention. A given such article of manufacture may comprise, for example, a storage device such as a storage disk, a storage array or an integrated circuit containing memory, as well as a wide variety of other types of computer program products. The term "article of manufacture" as used herein should be understood to exclude transitory, propagating signals.

The network interface 118 allows the threat detection and remediation system 112 to communicate over the network 110 with the client devices 104, and illustratively comprises one or more conventional transceivers.

The processor 114 further comprises a passive mode protection module 120, a proactive mode protection module 122 and a modular watering hole detection framework 124. The passive mode protection module 120 may monitor web browsing activity of the client devices 104 in real-time to check for evidence of watering hole attack security threats to the enterprise.

The proactive mode protection module 122 may monitor web browsing activity of the client devices over time to identify frequently visited ones of the enterprise-accessible websites 106 that may be susceptible to watering hole attacks. The proactive mode protection module 122 may maintain a list or other repository of such susceptible websites, possibly in the attack database 108, and periodically check the susceptible websites for evidence of watering hole attack threats. The proactive mode protection module 122 may also, in some embodiments, monitor enterprise-accessible websites which are not part of the list, database or other repository of susceptible websites to check for evidence of watering hole attack threats.

The modular watering hole detection framework 124 provides a number of modules used by the passive mode protection module 120 and/or the proactive mode protection module 122 for checking websites for evidence of watering hole attack threats. Additional details regarding the passive mode protection module 120, proactive mode protection module 122 and modular watering hole detection framework 124 will be described in further detail below with respect to FIGS. 2-7.

The arrangement described above advantageously permits the threat detection and remediation system 112 to focus its efforts on particular enterprise-accessible websites 106 that are most likely to be subject to watering hole attacks. Accordingly, the limited resources of the threat detection and remediation system 112 can be more intelligently and effectively deployed in computer network 100, resulting in improved performance as well as enhanced security against watering hole and other types of attacks.

It is to be appreciated that this particular arrangement of modules 120, 122 and 124 illustrated in the threat detection and remediation system 112 of the FIG. 1 embodiment is presented by way of example only, and alternative arrangements can be used in other embodiments. For example, the functionality associated with the modules 120, 122 and 124 in other embodiments can be combined into a single module, or separated across a larger number of modules. As another example, multiple distinct processors can be used to implement different ones of the modules 120, 122 and 124 or portions thereof.

At least portions of the passive mode protection module 120, proactive mode protection module 122 and modular watering hole detection framework 124 may be implemented at least in part in the form of software that is stored in memory 116 and executed by processor 114.

It is to be understood that the particular set of elements shown in FIG. 1 for detection and remediation of watering hole attacks directed to an enterprise is presented by way of illustrative example only, and in other embodiments additional or alternative elements may be used. Thus, another embodiment may include additional or alternative systems, devices and other network entities, as well as different arrangements of modules and other components.

By way of example, in other embodiments, the threat detection and remediation system 112 may be implemented external to enterprise SOC 102, such that the enterprise SOC 102 can be eliminated.

In some embodiments, the threat detection and remediation system 112 may be part of or otherwise associated with a system other than the enterprise SOC 102, such as, for example, a critical incident response center (CIRC).

Additionally or alternatively, the threat detection and remediation system 112 can be part of or incorporate an otherwise conventional security analytics system, such as the RSA Security Analytics system commercially available from RSA, The Security Division of EMC Corporation of Hopkinton, Mass.

Other embodiments can implement the threat detection and remediation system 112 as part of or in conjunction with a security information and event management (SIEM) system, such as the enVision® platform, also commercially available from RSA. Such an SIEM system is also considered another possible example of a "network security system" as that term is broadly used herein.

An exemplary process for passive detection of watering hole attacks will now be described in more detail with reference to the flow diagram of FIG. 2. It is to be understood that this particular process is only an example, and that additional or alternative processes for passive detection of watering hole attacks can be carried out in other embodiments.

In this embodiment, the process includes steps 200 through 214. These steps are assumed to be performed by the processor 114 of the threat detection and remediation system 112 utilizing passive mode protection module 120. The process begins with step 200, monitoring the browsing of one or more client devices, such as the client devices 104 of users associated with an enterprise. The client devices may be computing or other processing devices utilized by the employees, customers, partners or other users associated with the enterprise. For example, the threat detection and remediation system 112 may be designed to protect an enterprise from watering hole attacks by monitoring the web browsing activity of devices utilized by that enterprise's employees. As another example, the threat detection and remediation system 112 may provide a service which customers or partners of an enterprise may register or otherwise sign up for so as to receive protection from watering hole attacks. Thus, in some embodiments the threat detection and remediation system 112, and more generally the enterprise SOC 102, may be associated with one enterprise while the client devices 104 being monitored are associated with a different enterprise.

Monitoring browsing activity in step 200 may in some cases involve monitoring all or some portion of the network traffic of client devices 104. As discussed above, a watering hole attack is a security threat wherein the target of the attack may be an enterprise or one or more members of an enterprise. An attacker attempts to guess or observe which websites the members of the enterprise are likely to visit, and then compromise such websites. Thus, when members of the enterprise visit the compromised websites, the attacker can infect the enterprise. In some instances, a watering hole attack may be particularly successful by targeting websites that users of an enterprise consider safe, which may include trusted websites, websites that are only accessible behind the enterprise's firewall or via a virtual private network, etc.

In some embodiments, the monitoring in step 200 includes monitoring all web browsing activity or other network traffic of the client devices 104. In other embodiments, the monitoring in step 200 may be directed only to network traffic involving the client devices 104 and websites considered susceptible to watering hole attacks, only to network traffic involving the client devices 104 and unknown websites, only to network traffic involving the client devices 104 and websites not part of a whitelist, etc. Monitoring may also be based on a user of a given client device 104. For example, the network traffic of certain users or classes of users such as IT managers, system administrators, etc. may or may not be monitored based on that user's status. For example, users having greater access to or control over an enterprise may have stricter monitoring requirements, as the potential threat posed to the enterprise by compromise of such a user may be relatively large as compared to other types of users.

In step 202, a determination is made as to whether one of the client devices 104, such as client device 104-1, attempts to visit a given website being monitored (e.g., one of the enterprise-accessible websites 106 shown in FIG. 1). As detailed above, the websites or more generally network traffic being monitored may include all websites accessible by the client device 104-1 or some subset of the websites accessible by the client device 104-1. If the result of step 202 is no, the process continues with step 200, monitoring the browsing of the client devices 104. If the result of step 202 is yes, the process proceeds with step 204, checking whether the given website is part of a watering hole attack. Various techniques that may be used to determine whether the given website is part of a watering hole attack will be described in further detail below with respect to FIGS. 5-7.

In step 206, a determination is made as to whether the given website is part of a watering hole attack. If the result of step 206 is no, then the client device 104-1 is permitted to access the given website in step 208 and the process loops back to step 200. If the result of step 206 is yes, then remedial action is taken. Such remedial action may include performing any combination of steps 210, 212 and 214 to be discussed below. The remedial actions in steps 210, 212 and 214 are examples of what is more generally referred to herein as modifying access by a client device to a website. After such remedial action is taken, the process again loops back to step 200.

In step 210, malicious elements in the given website are blocked and/or filtered. Blocking the given website includes preventing the client device 104-1 from visiting the given website. Blocking may be achieved using a variety of techniques. For example, the organizational or enterprise Domain Name System (DNS) server can block access by the client device 104-1 to the given website. In response to a request by the client device 104-1 to access the given website, the enterprise DNS server blocks access by replying to the request with a different IP address than the given website. As another example, an enterprise firewall may be used to block access to the given website by dropping packets to and from the IP address of the given website. Filtering the given website includes allowing the client device 104-1 to browse the given website while blocking certain web elements of the given website. Such web elements may include, by way of example, JavaScript code snippets and other executable components identified as being malicious. This filtering may be achieved using techniques similar to those used for blocking advertisements on content serving websites.

In step 212, the user of the client device 104-1 is notified that the given website is part of a watering hole attack. In some embodiments, this involves transmitting an alert or other notification to the client device 104-1. The alert or notification may utilize one or more application programming interfaces (APIs) of the client device 104-1 so as to modify the normal operation of that user's web browser or other application being used to access the given website. This modification may include activating an icon or other status indicator to show that the given website is not secure, requiring the user to confirm that they wish to visit the given website even though it is potentially part of a watering hole attack or other security threat, etc. The alert or notification may also, in some embodiments, require the user to authenticate in order to visit the given website, or to visit the website in a sandboxed application environment.

In step 214, authorized personnel may be notified that the given website is part of a watering hole attack. The authorized personnel may include, for example, the users of one or more other ones of the client devices 104, system administrators or IT managers of the enterprise SOC 102, etc. Step 214 in some embodiments involves transmitting an alert or notification to the authorized personnel, which prompts the authorized personnel to investigate the given website further and permit or reject access by the client device 104-1 to the given website. For example, the notification or alert in step 214 may be delivered to an IT manager or supervisor of the user of the client device 104-1 who will take further remedial action with regards to the attempt by the user of client device 104-1 to access the given website.

As mentioned above, embodiments may use any one of or combination of steps 210, 212 and 214 in response to determining that a given website is part of a watering hole attack in step 206. In addition, in some embodiments additional or alternative remedial action may be taken in response to determining that a given website is part of a watering hole attack in step 206. Such remedial action may include, by way of example, generating a notification or alert that is sent to an operator of the given website, adding the given website to a blacklist of websites blocked by the enterprise, etc. The blacklist may be implemented by at least one of a DNS server operated by the enterprise and a firewall operated by the enterprise.

An exemplary process for partial proactive detection of watering hole attacks will now be described in more detail with reference to the flow diagram of FIG. 3. It is to be understood that this particular process is only an example, and that additional or alternative processes for partial proactive detection of watering hole attacks can be carried out in other embodiments.

In this embodiment, the process includes steps 300 through 312. These steps are assumed to be performed by the processor 114 of the threat detection and remediation system 112 utilizing proactive mode protection module 122. The process begins with step 300, monitoring browsing of one or more client devices such as client devices 104. In step 302, a list of websites is defined based on the monitored browsing. The list of websites may be those that are identified as potential targets for a watering hole attack threat to the enterprise based on patterns of web browsing activity. As discussed above, in some watering hole attacks the attacker seeks to infect an enterprise by compromising a set of websites that are trusted by the enterprise or frequently visited by one or more users associated with the enterprise. Thus, the list may be defined as trusted websites or frequently visited websites. The enterprise-accessible websites 106 shown in FIG. 1, or some subset thereof, may form the list defined in step 302.

The process continues with step 304, periodically checking the websites in the list to determine if any are part of a watering hole attack. Step 304 may be performed every hour, day, week, month, etc. as desired for a particular level of security. Step 304, however, need not be performed on a regular schedule. For example, in some embodiments step 304 may be performed in response to detection of or indications of new watering hole attack threats in the news. In other embodiments, step 304 may be performed in response to an explicit request from an authorized user, such as a system administrator, IT manager, etc.

In step 306, a determination is made as to whether a given website in the list is part of a watering hole attack based on the checks performed in step 304. If the result of step 306 is no, the process loops back to step 304 until the next periodic check of the list of websites. It is important to note that steps 300 and 302 may be performed continuously, at regular intervals, or otherwise repeated such that the list checked in step 304 may change over time. If the result of step 306 is yes, indicating that the given website is part of a watering hole attack, remedial action is taken by performing any combination of steps 308, 310 and 312. The remedial actions of steps 308, 310 and 312 are similar to the remedial actions taken in steps 210, 212 and 214, respectively, that were described above with respect to the FIG. 2 process. After taking the remedial action, which includes any combination of steps 308, 310, 312 as well as other additional or alternative remedial actions, the process loops back to step 300 and/or step 304.

Figure 3:
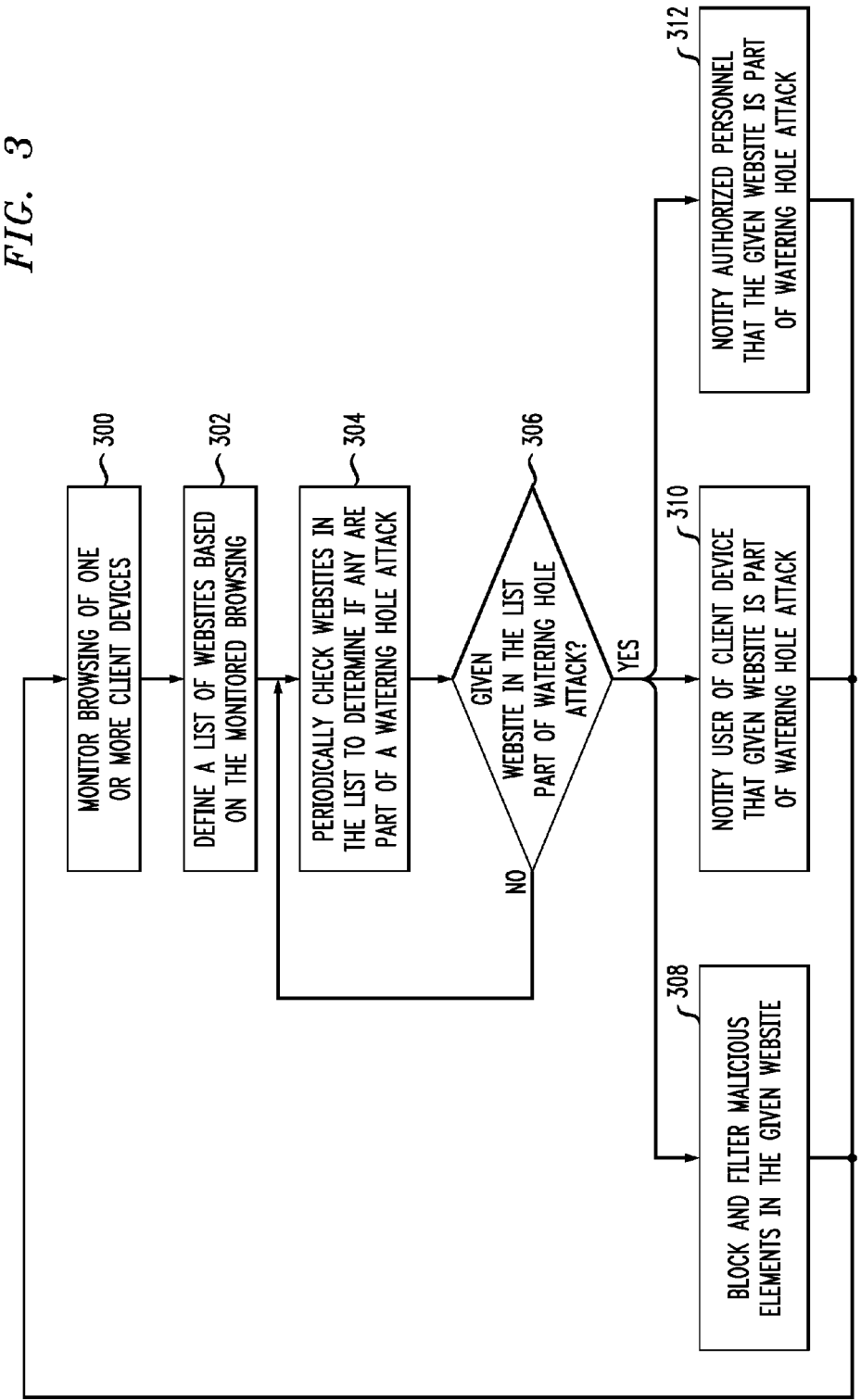
FIG. 3 is a flow diagram of an exemplary process for proactive detection of watering hole attacks in an illustrative embodiment.
Figure 4:
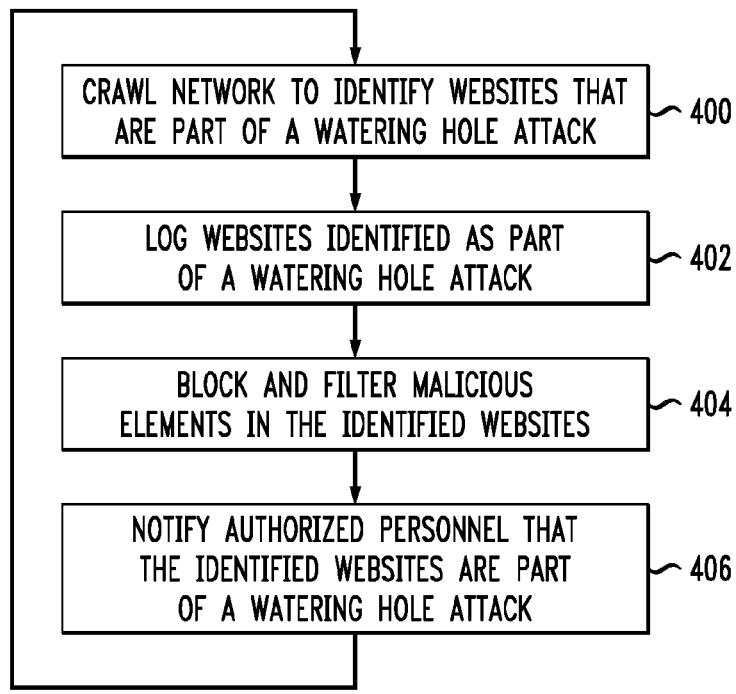
FIG. 4 is a flow diagram of another exemplary process for proactive detection of watering hole attacks in an illustrative embodiment.

The FIG. 3 process described above is referred to as a partial proactive protection mode, where the threat detection and remediation system 112 scans and checks a predefined set of websites periodically according to the decision of the IT, network, information security or other personnel of an enterprise. Embodiments, however, may also include what is referred to herein as a fully proactive protection mode. FIG. 4 shows an exemplary process for a fully proactive protection mode for detection of watering hole attacks. It is to be understood that the particular process shown in FIG. 4 is only an example, and that additional or alternative processes for fully proactive modes for detection of watering hole attacks can be carried out in other embodiments.

In this embodiment, the process includes steps 400 through 406. These steps are assumed to be performed by the processor 114 of the threat detection and remediation system 112 utilizing proactive mode protection module 122. The process begins with step 400, crawling a network such as network 110 to identify websites that part of a watering hole attack. In contrast with the FIG. 3 process, which checks a list of websites defined based on monitoring the browsing activity of client devices 104 such as a subset of the enterprise-accessible websites 106, the FIG. 4 process may crawl the network 110 generally so as to search all websites, such as all the enterprise-accessible websites 106.

In step 402, websites identified as part of a watering hole attack are logged to a file, database or other repository such as the attack database 108. In some embodiments, the logs are used to form a blacklist of infected websites. After logging the websites identified as part of the watering hole attack, remedial action is taken in steps 404 and/or 406. In step 404, malicious elements in the identified websites are blocked and/or filtered in a manner similar to that described above with respect to step 210 in the FIG. 2 process. For example, the above-described blacklist may be utilized to block access to the identified websites in an enterprise DNS server or enterprise firewall. In step 406, authorized personnel are notified that the identified websites are part of a watering hole attack in a manner similar to that described above with respect to steps 212 and 214 in the FIG. 2 process.

Figure 2:
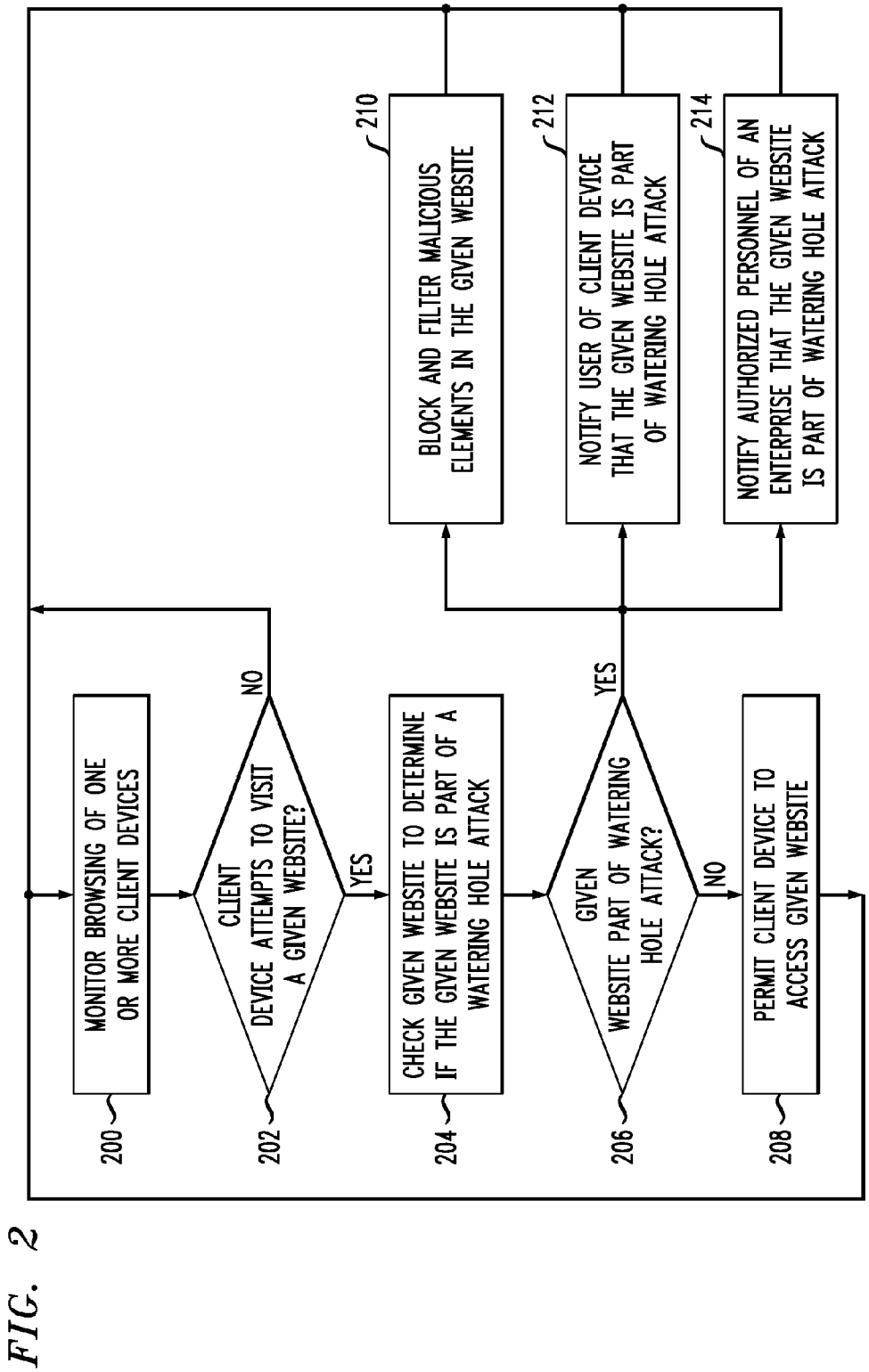
FIG. 2 is a flow diagram of an exemplary process for passive detection of watering hole attacks in an illustrative embodiment.

While the FIG. 2, FIG. 3 and FIG. 4 processes have been described separately above, it is to be appreciated that embodiments are not limited solely to performing one of these processes. Instead, some embodiments may involve performing two or more of the FIG. 2, FIG. 3 and FIG. 4 processes. As an example, in some embodiments the FIG. 3 partial proactive process is executed periodically, while the FIG. 4 fully proactive process is executed whenever threat detection and remediation system 112, or the enterprise SOC 102, has unused resources. In other embodiments, the FIG. 2 passive mode process may be used in conjunction with one or both of the FIG. 3 partial proactive process and the FIG. 4 fully proactive process.

Figure 5:
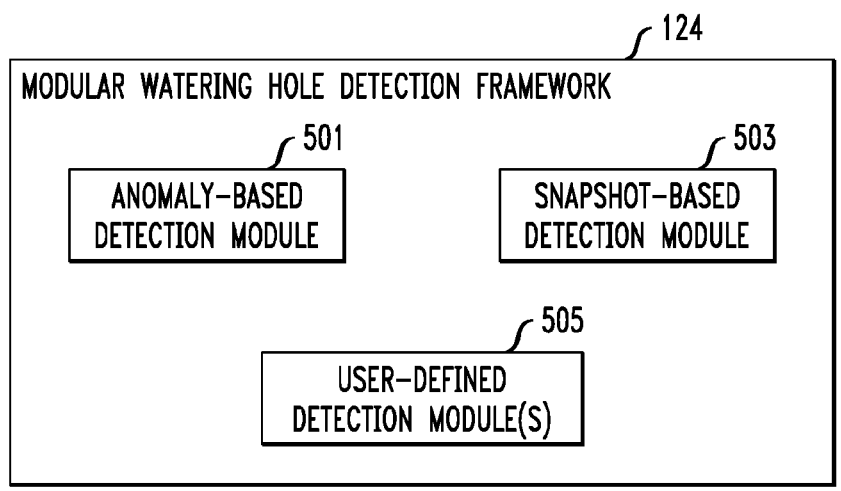
FIG. 5 shows a detailed view of an example of the modular watering hole detection framework of FIG. 1.

FIG. 5 shows an example of the modular watering hole detection framework 124 of the threat detection and remediation system 112. As shown in FIG. 5, the modular watering hole detection framework 124 contains a number of modules which may be used by the threat detection and remediation system 112 for determining whether a particular website is part of a watering hole attack. The modules include an anomaly-based detection module 501, a snapshot-based detection module 503 and user-defined detection modules 505. Each of these modules will be discussed in turn below.

Figure 6:
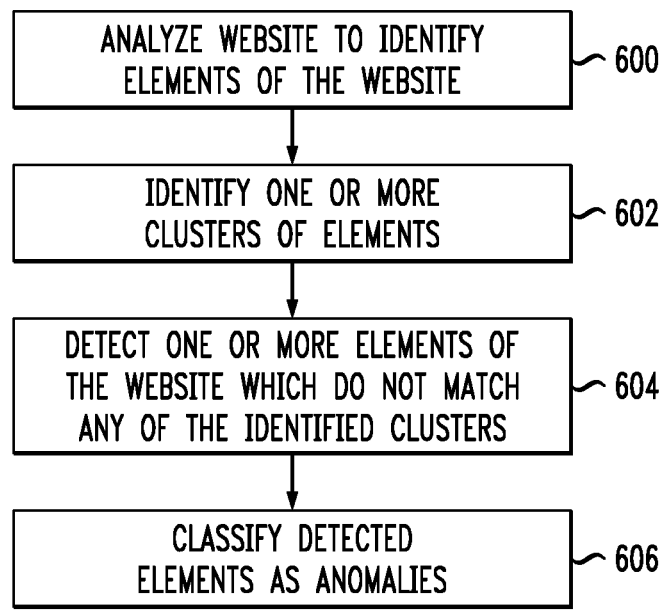
FIG. 6 is a flow diagram of an exemplary process for anomaly-based detection of watering hole attacks in an illustrative embodiment.

Anomaly-based detection module 501 searches for anomalies in a given website to detect evidence of a watering hole attack. FIG. 6 shows an exemplary process for anomaly-based detection of watering hole attacks, assumed to be performed by the processor 114 of the threat detection and remediation system utilizing the anomaly-based detection module 501 of the modular watering hole detection framework 124. The process includes steps 600 through 606.

The process begins in step 600 with analyzing a website to identify elements or resources of the website. Each web page of a website that is loaded and rendered using a web browser or similar application such as a mobile application can contain many "atomic" components which provide the web page with its look and feel or other functionality. By way of example, such atomic components or web elements include HyperText Markup Language (HTML) templates and forms, Cascading Style Sheets (CSS), JavaScript and Flash code snippets, etc.

In step 602, one or more clusters of elements are identified. Clusters may be identified based on various factors. In some embodiments, the geolocation of each element of the website is checked, and then the elements are clustered based on their geographical distance from one another. The geographic location of each web element may be determined by resolving the IP address of each element. Each element of a web page or website can have its own uniform resource locator (URL). For example, various web pages include resources or elements from other websites by linking to such elements or resources via URLs. The geolocation of the elements may be determined by resolving the IP address of the URLs to their corresponding physical server location.

In other embodiments, various other techniques and parameters may be used to cluster the elements or resources of a website. As an example, different elements or resources of a website may be analyzed based on the standards or coding languages used. If most of the elements of a website conform to the HTML5 standard or utilize JavaScript, while only one or a few elements utilize Adobe® Flash, those elements utilizing Adobe® Flash may be classified as anomalies. As another example, the executable code of different elements or resources of a website may be textually analyzed so as to identify outliers. Various other types of analytics may be utilized for classification of elements or resources of a web page or website as anomalies.

The process continues with step 604, detecting one or more elements of the website which do not match any of the identified clusters. In step 606, the elements which do not match any of the identified clusters are classified as anomalies.

As an example, consider a website with a first cluster of resources having geolocations in the Western United States, a second cluster of resources having geolocations in Western Europe, and a single resource having a geolocation in China.

In this example, the resource having a geolocation in China does not match either the first or the second cluster and thus the resource or element with the geolocation in China would be classified as an anomaly.

Classification of a given resource or element of a website as an anomaly in step 606 in some embodiments constitutes evidence of a watering hole attack threat to an enterprise. In some cases, this alone is enough for the threat detection and remediation system 112 to blacklist the website or take other remedial action such as blocking or filtering the malicious elements of the website. In other embodiments, however, further processing may be performed before classifying the website as part of a watering hole attack. For example, in some embodiments a website is not classified as part of a watering hole attack unless multiple modules in the modular watering hole detection framework 124 detect evidence of a watering hole attack. As another example, in some embodiments classification of an element of a website as an anomaly in step 606 prompts IT or information security personnel to further investigate the website to confirm whether that website is part of a watering hole attack threat to an enterprise.

Figure 7:
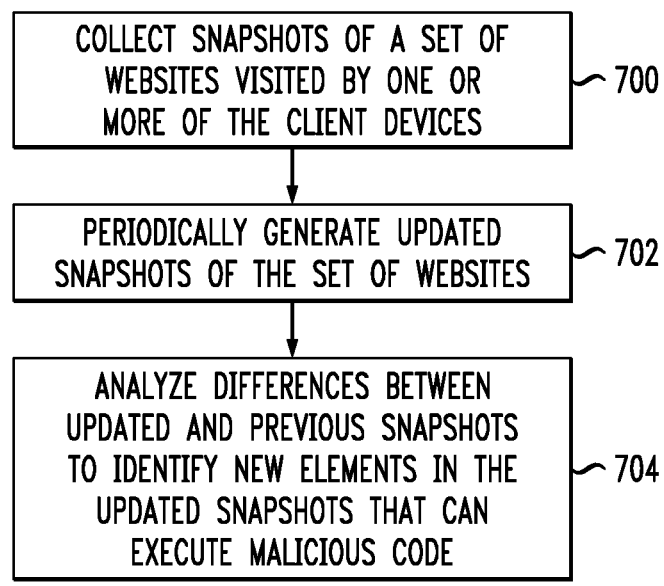
FIG. 7 is a flow diagram of an exemplary process for snapshot-based detection of watering hole attacks in an illustrative embodiment.

Snapshot-based detection module 503 compares snapshots of websites to identify differences, and inspects such differences for the addition of or modification of elements or resources to detect evidence of a watering hole attack. FIG. 7 shows an exemplary process for snapshot-based detection of watering hole attacks, assumed to be performed by the processor 114 of the threat detection and remediation system utilizing the snapshot-based detection module 503 of the modular watering hole detection framework 124. The process includes steps 700 through 704.

The process begins with step 700, collecting or generating snapshots of a set of websites visited by one or more of the client devices 104. In some embodiments, the snapshots may be smart snapshots. The term smart snapshots is used herein to refer to a snapshot that ignores sections of a web page or website which cannot execute code. The use of smart snapshots in some embodiments provides various advantages. For example, smart snapshots may utilize less storage relative to a traditional snapshot of an entire web page or website. Also, as smart snapshots need not capture elements of a web page or website that cannot execute code, smart snapshots may be generated faster and using fewer resources relative to a traditional snapshot of an entire web page or website. The smart snapshots may be stored in a database or other repository such as the attack database 108.

While the above-described smart snapshots provide various advantages, embodiments are not limited solely for use with smart snapshots. Traditional snapshots may be used in other embodiments for various reasons. As an example, in some embodiments a traditional snapshot may be used by the anomaly-based detection module 501 in addition to the snapshot-based detection module 503 for checking for evidence of a watering hole attack threat to an enterprise.

The process continues with step 702, periodically generating updated smart snapshots of the set of websites. In step 704, the differences between the updated and previous snapshots are analyzed to identify new or modified elements in the updated snapshots. Such new or modified elements may be analyzed to determine if they contain malicious executable code evidencing a watering hole attack security threat to an enterprise.

The modular watering hole detection framework 124, as discussed above, also includes a number of user-defined detection modules 505. The user-defined detection modules 505 may use various techniques or algorithms for the detection of watering hole attack security threats. For example, one of the user-defined detection modules 505 may utilize static signature detection. If a watering hole attack is detected, a signature of such attack may be generated and added to a repository or database such as attack database 108. Elements or resources of websites may be compared against the signatures stored in the attack database 108 to identify evidence of a watering hole attack security threat. These and other techniques and algorithms may be utilized by the user-defined detection modules 505 of the modular watering hole detection framework 124 for checking websites for evidence of watering hole attacks. As discussed above, the classification of a website as being part of a watering hole attack security threat to an enterprise may be based on evidence determined using any one of or combination of the modules forming the modular watering hole detection framework 124.

A number of illustrative use cases will be described below. It is to be appreciated, however, that embodiments are not limited solely to the specific use cases describe below.

First, consider a passive mode protection scenario wherein an employee or other user associated with an enterprise types a website address or selects a link or other user interface feature of client device 104-1 to retrieve information from enterprise-accessible website 106-2. On detecting such an action, the threat detection and remediation system 112 intercepts and modifies the normal processing associated with such action. The threat detection and remediation system 112, utilizing the passive mode protection module 120 and one or more modules of the modular watering hole detection framework 124, scans enterprise-accessible website 106-2 before the enterprise-accessible website 106-2 is loaded in a web browser or other application on client device 104-1.

Assuming that a scan of enterprise-accessible website 106-2 finds evidence of a watering hole attack threat to the enterprise, the threat detection and remediation system 112 takes remedial action, such as blocking or filtering elements or resources of the website or a web page of the website that are loaded in the web browser or other application on client device 104-1.

The remedial action may also include transmitting a notification or alert for display on the client device 104-1. Such an alert may, for example, present the following on a screen of the client device 104-1: "Enterprise-accessible website 106-2 is spreading malicious resources and tried to infect you. The following malicious resources have been identified and blocked or filtered: malicious URL A, malicious URL B and malicious URL C." The particular text of the notification may vary in other embodiments. For example, in some embodiments the notification may simply indicate that the enterprise-accessible website 106-2 is spreading malicious resources without identifying the particular elements being blocked and/or filtered. In other embodiments, the notification need not contain any text but may instead may result in activation of an icon on a screen of client device 104-1, or cause the client device 104-1 to vibrate or play an alarm sound, etc.

The remedial action may further include logging an event in attack database 108 and adding enterprise-accessible website 106-2 to a blacklist. In some embodiments, the remedial action also includes notifying the enterprise SOC 102, an IT manager, information security personnel or other users in real-time of the watering hole attack security threat to the enterprise posed by enterprise-accessible website 106-2.

Next, consider a partial proactive protection mode scenario wherein a network administration, IT manager, information security personnel or other user prepares a list of the most visited websites by an enterprise's employees or other users. This list may be a subset of the enterprise-accessible websites 106. Preparation of the list may be a manual task, or be automated at least in part by the threat detection and remediation system 112 monitoring network traffic of client devices 104. The threat detection and remediation system 112 will scan the list of websites periodically and notify the enterprise SOC 102, an IT manager, information security personnel or other users upon detection of a watering hole attack security threat to the enterprise and add the infected websites to a blacklist.

Last, consider a fully proactive protection mode scenario wherein the threat detection and remediation system 112 crawls the Internet in an infinite loop to identify and log malicious websites posing a watering hole attack security threat to an enterprise. The threat detection and remediation system 112 may provide a list of infected websites to the enterprise SOC 102 once a day, and such infected sites may be added to a blacklist.

The above scenarios are not mutually exclusive to one another. As discussed above, in some embodiments the threat detection and remediation system 112 may perform any combination of passive mode, partial proactive mode and fully proactive mode protection. Thus, the specific scenarios described above are presented by way of example only, and embodiments are not limited to any one of or combination of the above scenarios. In addition, the details regarding how websites are checked for evidence of watering hole attacks as well as the various remedial actions taken may vary in different embodiments.

It should again be emphasized that the above-described embodiments of the invention are presented for purposes of illustration only. Many variations may be made in the particular arrangements shown. For example, although described in the context of particular network and device configurations, the techniques are applicable to a wide variety of other types of computer networks and processing device configurations. Also, different types and arrangements of network security systems, modules, notifications, alerts and other features can be used in other embodiments. Moreover, the assumptions made herein in the context of describing some illustrative embodiments should not be construed as limitations or requirements of the invention, and need not apply in other embodiments. Numerous other alternative embodiments within the scope of the appended claims will be readily apparent to those skilled in the art.

What is claimed is:

1. A method comprising:
   obtaining data characterizing web browsing activity of a group of users of an enterprise;
   processing the data characterizing the web browsing activity to identify one or more patterns of web browsing activity of the group of users;
   selecting, based on the patterns of web browsing activity, at least one website to check for evidence of a watering hole attack threat to the enterprise;
   analyzing elements of said at least one website to identify executable code evidencing the watering hole attack threat to the enterprise; and
   modifying access by one or more client devices of the enterprise to said at least one website responsive to identifying executable code of said at least one website evidencing the watering hole attack threat to the enterprise;
   wherein the method is performed by at least one processing device comprising a processor coupled to a memory; and
   wherein analyzing the elements of said at least one website comprises:
      generating an updated snapshot of said at least one website;
      comparing the updated snapshot to one or more previous snapshots of said at least one website;
      identifying one or more new elements of said at least one website based on comparing the updated snapshot to the one or more previous snapshots; and
      analyzing executable code of the one or more new elements to determine evidence of the watering hole attack threat to the enterprise.

2. The method of claim 1 wherein selecting said at least one website comprises intercepting an attempted access to said at least one website by a given one of the client devices.

3. The method of claim 2 further comprising transmitting a notification indicating the watering hole attack posed by said at least one website over at least one network to the given client device.

4. The method of claim 2 further comprising transmitting a notification indicating the watering hole attack posed by said at least one website over at least one network to at least one of the client devices other than the given client device.

5. The method of claim 1 further comprising generating a set of websites identified as potential targets for the watering hole attack threat to the enterprise based on the patterns of web browsing activity, wherein selecting said at least one website comprises periodically selecting respective ones of the set of websites identified as potential targets for the watering hole attack threated to the enterprise.

6. The method of claim 1 wherein said at least one website is selected by crawling said at least one network to search for websites susceptible to watering hole attacks.

7. The method of claim 1 wherein modifying access by the one or more client devices of the enterprise to said at least one website comprises at least one of blocking and filtering elements of said at least one website comprising malicious executable code.

8. The method of claim 1 wherein modifying access by the one or more client devices of the enterprise to said at least one website comprises adding said at least one website to a blacklist of websites blocked by the enterprise, the blacklist being implemented by at least one of a domain name system operated by the enterprise and a firewall operated by the enterprise.

9. The method of claim 1 wherein analyzing the elements of said at least one website further comprises:
   identifying one or more clusters of elements of said at least one website;
   detecting elements of said at least one website that do not match the identified clusters; and
   classifying the detected elements as anomalies.

10. The method of claim 9 further comprising analyzing executable code of the elements classified as anomalies to determine evidence of the watering hole attack threat to the enterprise.

11. The method of claim 9 wherein the elements of said at least one website are clustered based on the geographic distances between sources of each of the elements.

12. The method of claim 9 wherein the elements of said at least one website are clustered based on coding language.

13. The method of claim 9 wherein the elements of said at least one website are clustered based on textual analysis.

14. The method of claim 1 wherein at least one of the one or more previous snapshots and the updated snapshot comprises a smart snapshot that ignores elements of said at least one website that cannot execute code.

15. A computer program product comprising a non-transitory processor-readable storage medium having stored therein program code of one or more software programs, wherein the program code when executed by a processing device cause the processing device:
- to obtain data characterizing web browsing activity of a group of users of an enterprise;
- to process the data characterizing the web browsing activity to identify one or more patterns of web browsing activity of the group of users;
- to select, based on the patterns of web browsing activity, at least one website to check for evidence of a watering hole attack threat to the enterprise;
- to analyze elements of said at least one web site to identify executable code evidencing the watering hole attack threat to the enterprise; and
- to modify access by one or more client devices of the enterprise to said at least one website responsive to identifying executable code of said at least one website evidencing the watering hole attack threat to the enterprise;
- wherein analyzing the elements of said at least one website comprises:
  - generating an updated snapshot of said at least one website;
  - comparing the updated snapshot to one or more previous snapshots of said at least one website;
  - identifying one or more new elements of said at least one website based on comparing the updated snapshot to the one or more previous snapshots; and
  - analyzing executable code of the one or more new elements to determine evidence of the watering hole attack threat to the enterprise.

16. The computer program product of claim 15 wherein analyzing the elements of said at least one website further comprises:
- identifying one or more clusters of elements of said at least one website based on geographic distances between sources of each of the elements of said at least one website;
- detecting elements of said at least one website that do not match the identified clusters;
- classifying the detected elements as anomalies; and
- analyzing executable code of the elements classified as anomalies to determine evidence of the watering hole attack threat to the enterprise.

17. The computer program product of claim 15 wherein at least one of the one or more previous snapshots and the updated snapshot comprises a smart snapshot that ignores elements of said at least one website that cannot execute code.

18. An apparatus comprising:
a processing device comprising a processor coupled to a memory;
the processing device being configured:
- to obtain data characterizing web browsing activity of a group of users of an enterprise;
- to process the data characterizing the web browsing activity to identify one or more patterns of web browsing activity of the group of users;
- to select, based on the patterns of web browsing activity, at least one website to check for evidence of a watering hole attack threat to the enterprise;
- to analyze elements of said at least one website to identify executable code evidencing the watering hole attack threat to the enterprise; and
- to modify access by one or more client devices of the enterprise to said at least one website responsive to identifying executable code of said at least one website evidencing the watering hole attack threat to the enterprise;
- wherein analyzing the elements of said at least one website comprises:
  - generating an updated snapshot of said at least one website;
  - comparing the updated snapshot to one or more previous snapshots of said at least one website;
  - identifying one or more new elements of said at least one website based on comparing the updated snapshot to the one or more previous snapshots; and
  - analyzing executable code of the one or more new elements to determine evidence of the watering hole attack threat to the enterprise.

19. The apparatus of claim 18 wherein analyzing the elements of said at least one website further comprises:
- identifying one or more clusters of elements of said at least one website based on geographic distances between sources of each of the elements of said at least one website;
- detecting elements of said at least one website that do not match the identified clusters;
- classifying the detected elements as anomalies; and
- analyzing executable code of the elements classified as anomalies to determine evidence of the watering hole attack threat to the enterprise.

20. The apparatus of claim 18 wherein at least one of the one or more previous snapshots and the updated snapshot comprises a smart snapshot that ignores elements of said at least one website that cannot execute code.

* * * * *